(12) United States Patent
Duggan

(10) Patent No.: US 12,403,983 B2
(45) Date of Patent: Sep. 2, 2025

(54) HIGH-DRIVE ELECTRIC BICYCLE

(71) Applicant: Austin Duggan, Los Angeles, CA (US)

(72) Inventor: Austin Duggan, Los Angeles, CA (US)

(*) Notice: Subject to any disclaimer, the term of this patent is extended or adjusted under 35 U.S.C. 154(b) by 606 days.

(21) Appl. No.: 17/806,882

(22) Filed: Jun. 14, 2022

(65) Prior Publication Data
US 2023/0002005 A1    Jan. 5, 2023

Related U.S. Application Data

(60) Provisional application No. 63/218,489, filed on Jul. 5, 2021.

(51) Int. Cl.
| | | |
|---|---|---|
| B62K 25/30 | (2006.01) | |
| B62K 3/02 | (2006.01) | |
| B62K 25/04 | (2006.01) | |
| B62M 6/55 | (2010.01) | |
| B62M 9/06 | (2006.01) | |
| B62M 11/04 | (2006.01) | |

(52) U.S. Cl.
CPC ............... B62M 6/55 (2013.01); B62M 9/06 (2013.01); B62M 11/04 (2013.01)

(58) Field of Classification Search
CPC .......... B62M 9/06; B62M 6/55; B62M 11/04; B62M 9/105; B62M 6/65; B62M 6/70; B62M 6/40; B62M 9/12; B62M 9/121; B62M 9/02; B62K 3/02; B62K 5/05; B62K 25/286; B62K 19/34; B62K 25/26; B62K 25/30

USPC ............................................. 180/206.4, 205
See application file for complete search history.

(56) References Cited

U.S. PATENT DOCUMENTS

| | | | | |
|---|---|---|---|---|
| 5,370,200 A | * | 12/1994 | Takata | B60L 3/0092 280/214 |
| 6,131,683 A | * | 10/2000 | Wada | B62M 6/55 180/291 |
| 8,640,805 B2 | * | 2/2014 | Kuroki | B60L 50/20 180/205.1 |
| 2005/0087379 A1 | * | 4/2005 | Holland | B62M 6/60 180/206.7 |
| 2008/0314668 A1 | * | 12/2008 | Spanski | B62K 11/00 180/206.4 |
| 2014/0231163 A1 | * | 8/2014 | Stieger | B62M 6/55 180/206.4 |

FOREIGN PATENT DOCUMENTS

RU    140141 U1 * 4/2014

* cited by examiner

*Primary Examiner* — Valentin Neacsu
*Assistant Examiner* — Nabin Kumar Sharma
(74) *Attorney, Agent, or Firm* — Inskeep IP Group, Inc.

(57) ABSTRACT

A cycle is described in which an electric motor is coupled to a chainring or pedal sprocket via one or more chains or belts. The electric motor is also coupled to a sprocket of the rear wheel of the cycle. A clutch mechanism is further included between the linkage coupling the chainwheel and the electric motor such that either the electric motor, the pedals, or simultaneously both can drive the cycle. This design further allows the electric motor to be removed and the cycle to be pedaled normally.

17 Claims, 9 Drawing Sheets

HIGH-DRIVE ELECTRIC BICYCLE

RELATED APPLICATIONS

This application claims benefit of and priority to U.S. Provisional Application Ser. No. 63/218,489 filed Jul. 5, 2021 entitled High-Drive Electrical Bicycle, which is hereby incorporated herein by reference in its entirety.

BACKGROUND OF THE INVENTION

An electric bicycle is a bicycle that is equipped with an electrically powered motorization system that the rider can use to propel the bicycle or assist in propelling the bicycle. The distinct motorization systems utilized in electric bicycle designs are numerous, but they all typically require an electric motor, a motor controller, and a mechanical means of using these components to spin a wheel or wheels of the bicycle. Aside from "direct drive" hub motorization systems and friction motorization systems, neither of which is prominent, electric bicycle motorization systems also require motor reduction gears.

All else being equal, these components and the mechanical parts by which they function together add a substantial amount of additional weight, as well as complications for repair and user-serviceability. In addition, these components typically limit compatibility with traditional non-electric bicycle components, most notably gearsets and derailers, chainwheels, crank arms, and rear hubs. A design challenge is to devise an electric bicycle that is at least as practical as current designs while also implementing required motorization components in a way that greatly increases its power-to-weight ratio, ease of service, customizability, and backwards compatibility with off-the-shelf bicycle components.

SUMMARY OF THE INVENTION

A cycle, such as a bicycle or tricycle, is described in which an electric motor is coupled to a chainring or pedal sprocket via one or more chains or belts. The electric motor is also coupled to a sprocket of the rear wheel of the cycle. A clutch mechanism is further included between the linkage coupling the chainwheel and the electric motor such that either the electric motor, the pedals, or simultaneously both can drive the cycle. This design further allows the electric motor to be removed and the cycle to be pedaled normally.

One embodiment of the present invention comprises an electric bicycle frame that houses the electric motor in a way that allows it to be installed or removed without at any step of the process hampering the full functionality of the bicycle.

Another embodiment of the present invention comprises a bicycle frame that houses the required motorization components in a way that allows them to be installed or removed separately from one another, and with minimal mounting hardware necessary for secure attachment.

Another embodiment of the present invention comprises an electric bicycle that allows functional modularity of the motor such that a user may with relative ease install and utilize any one of a variety of electric motors without the necessity of altering the reduction system.

Another embodiment of the present invention comprises an electric bicycle that allows the functional modularity of a part or parts of the reduction system such that a user may with relative ease alter the overall reduction ratio of the motorization system without the necessity of altering any other components of the electric bicycle.

Another embodiment of the present invention comprises an electric bicycle that can be made compatible with the variety of common non-motorized bicycle bottom bracket, crank, hub, and chainwheel standards of which most non-motorized bicycles are compatible.

Another embodiment of the present invention comprises an electric bicycle that runs both the power emanating from the cyclists' cadence, and the power emanating from the electric motor to the rear wheel of the bicycle through a singular drivetrain.

Another embodiment of the present invention comprises an electric bicycle motorization system that reduces the RPMs of the electric motor only to the desired RPMs of the rear wheel of the bicycle.

In an embodiment of the invention, a bicycle headtube, top tube, bottom tube, seatstays, chainstays, and bottom bracket are welded together in the locations of a traditional triangular bicycle frame. In addition, an electric motor mount is placed in the area typically reserved for the longest portion of seattube between the top tube/seatstay junction and the bottom bracket. An embodiment of the invention also places a housing for a reduction gearbox or jackshaft called an "upper bracket" above the motor mount at or near the junction of the top-tube and seatstay. Embodiments may also swap the locations of the motor mount and upper bracket. For example, the upper bracket may be placed immediately above the bottom bracket, with the motor mount extending from the top of the upper bracket to the top tube/seatstay junction.

Another embodiment of the present invention comprises an electric motor with a spindle on at least one side which is mounted to the motor mount in the frame, with an output spindle of the motor located on the side of the bicycle that is opposite of the side with the bicycle chainwheel. Henceforth, this will be referred to as the "reduction-side" of the vehicle. Either a jackshaft or a reduction gearbox with spindles on either side is mounted within the upper bracket so that its input spindle is located on the reduction-side of the bicycle, and is parallel to the electric motor spindle. The output of the electric motor is made to drive the input of the jackshaft or reduction gearbox by way of a "primary reduction" drive system, for example a belt, chain, or shaft-drive system. The output of the jackshaft or reduction gearbox is made to drive the rear wheel of the bicycle by way of a "primary drivetrain" drive system like those commonly found on bicycles; a chain is envisioned, but belt or shaft-drive systems may work just as well.

This arrangement of components should now function in such a way that, when the electric motor is made to spin in a forward direction, the input spindle of the jackshaft or reduction gearbox is made to spin in that direction as well by way of the primary reduction system. This should cause the output spindle of the jackshaft or reduction gearbox to turn so as to activate the primary drivetrain, causing the rear wheel of the bicycle to spin in such a way that the bicycle would be propelled forward when in normal cycling conditions. The bicycle has now effectively been motorized.

Another embodiment of the present invention comprises a clutch attached to the output spindle of the jackshaft or reduction gearbox. This clutch will be connected to the chainwheel of the bicycle by way of a chainwheel-to-clutch drive system, for example a traditional bicycle chain, though other systems may be used. The clutch and chainwheel-to-clutch system must be installed in a way such that, when the rider pedals the cranks forward, the clutch is made to spin the primary drivetrain so that the bicycle would be propelled forward when in normal cycling conditions. Otherwise, the clutch will not be engaged when the cranks are at rest even if the motor is running.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION

Figure 1:
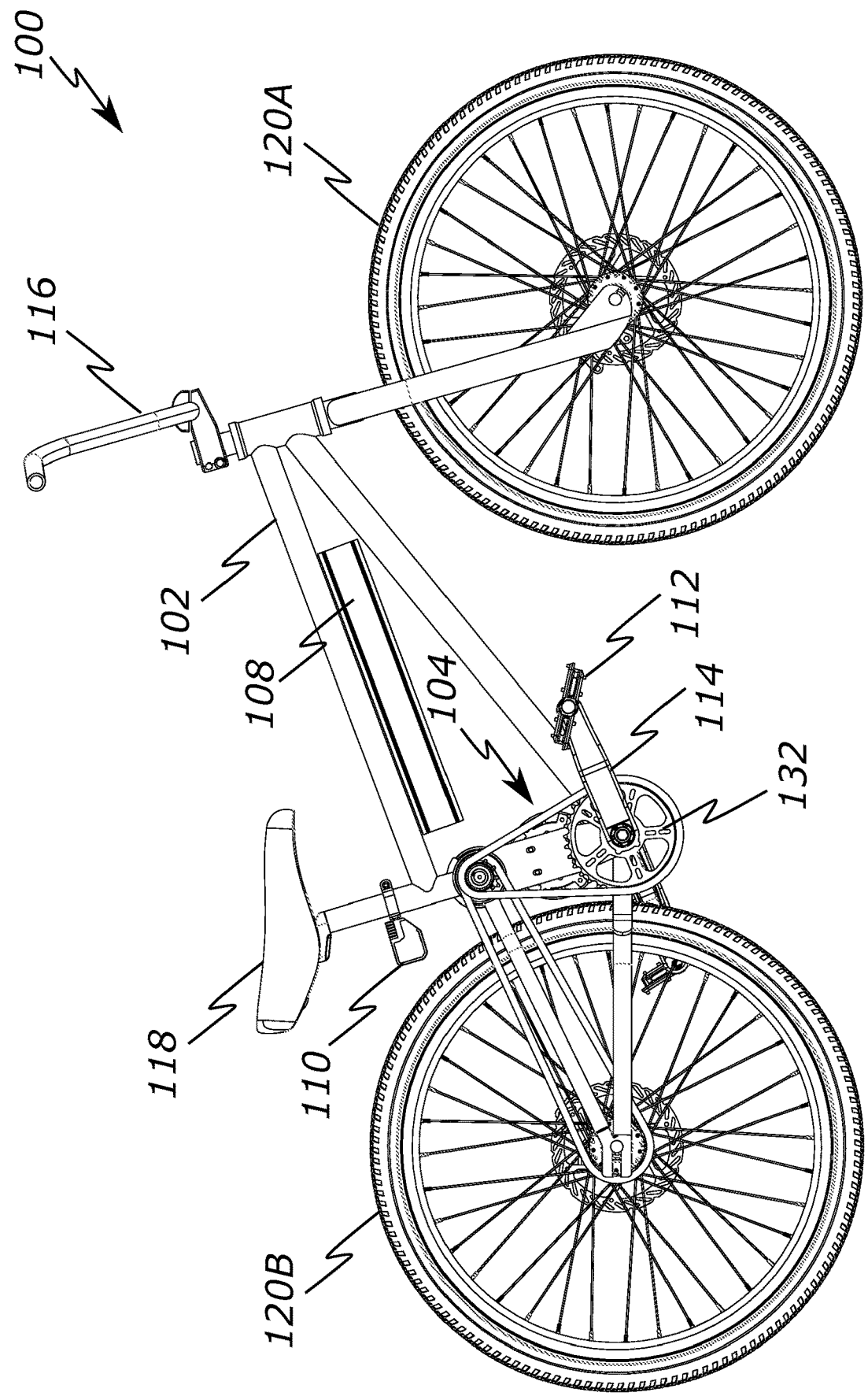
FIG. 1 illustrates a side view of a cycle according to the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention is generally directed to an electrically motorized and foot-powered cycle, generally referred to herein as a cycle. The term cycle should be understood to include a bicycle, tricycle, tandem bicycle, or other known designs including 1, 2, 3, 4, or more wheels.

The term chain is also used in this specification and should be understood to include cycle chains, flexible belts, or other known mechanisms that can be formed into a loop and connected to one or more pulleys, sprockets, spindles, or similar components. These components may also more generally be referred to as a flexible transmission linkage loop.

The present invention is generally directed to a cycle having a transmission connected to an electric motor, a pedal assembly, and a wheel of the cycle. The transmission may include a first chain loop connected to a pedal sprocket and to an output shaft, and may include a second chain loop connected to a wheel sprocket and to the output shaft. The output shaft may be either an output shaft of a reduction gear or may be the output shaft of an electric motor. Hence, the wheel sprocket (and therefore the wheel itself) can be rotated by either rotation of the output shaft via activation of the electric motor and/or by a user pedaling the pedal assembly. Further, a clutch assembly may be included between the pedal sprocket and the output shaft (e.g., on the output shaft or connected to the pedal sprocket) and configured to engage with forward pedal motion but become disengaged in the opposite direction or when stationary relative to movement of the output shaft.

FIGS. 1-10 illustrate various aspects of one specific embodiment of an electric cycle 100 according to the present invention. As discussed further below, the electric cycle 100 includes a transmission 104 that includes two linkages, a pedal input chain 126 and a drive chain 128, that are both coupled either directly or indirectly to an electric motor 106 (also shown in FIG. 9). This arrangement provides several advantages over prior electric bicycle designs, such as better electric motor placement on the cycle 100, easier removal and replacement of components of the cycle 100, easier use of different electric motors that may not necessarily be customized for use with a cycle 100, and easier gear ratio adjustment between the electric motor 106 and the transmission 104, among other advantages.

Figure 2:
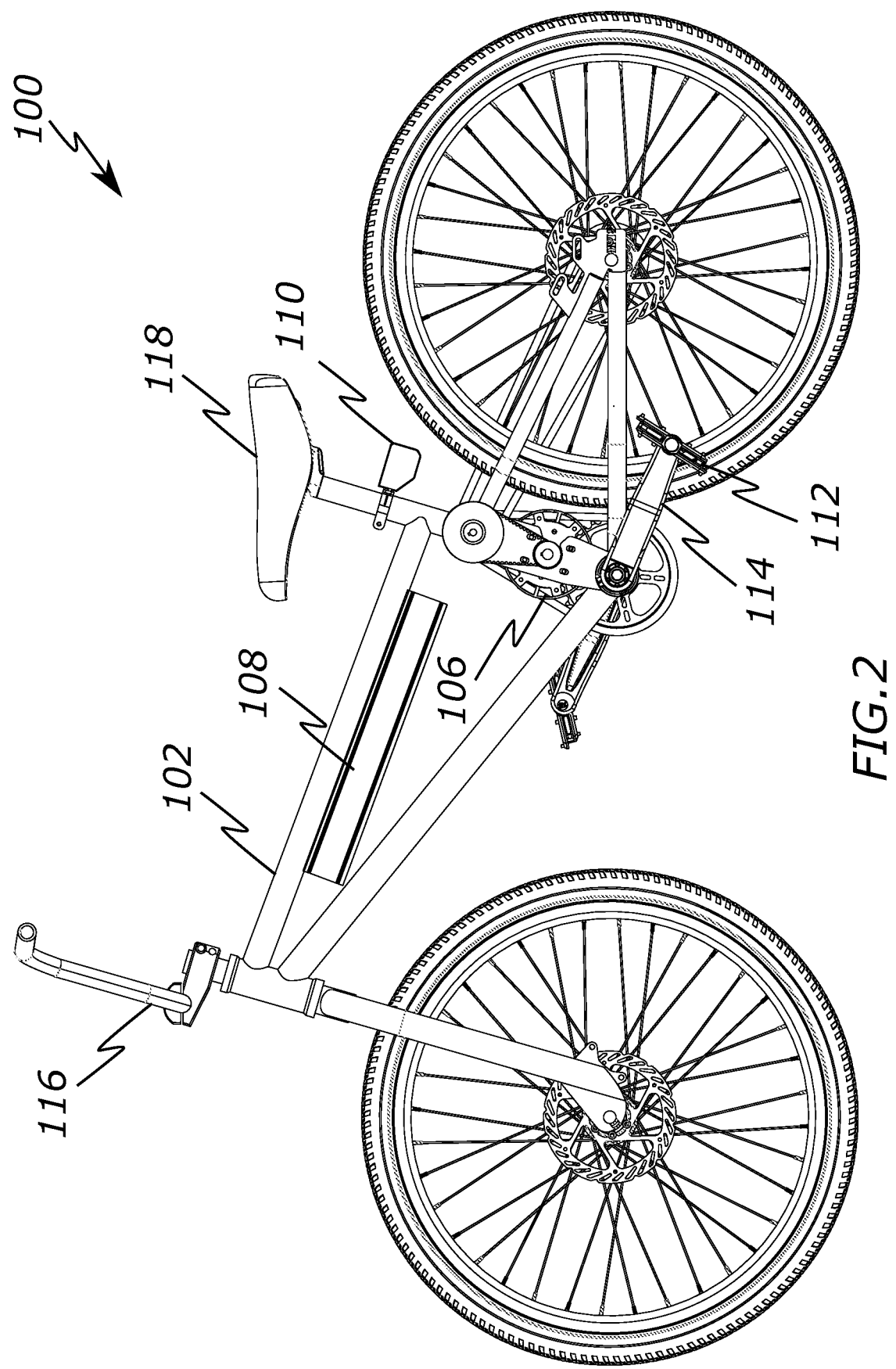
FIG. 2 illustrates an opposite side view of the cycle of FIG. 1.

The example embodiment seen in FIGS. 1 and 2 is directed to a two-wheeled BMX-style cycle 100. Again, different types and styles of cycles can also be used according to the present invention. The cycle 100 includes several components common to many cycles, such as a body frame 102, a handle assembly 116 including a handles and front fork attached to front wheel 120A, a crankset 114 connected to pedals 112, a chainring 132, a seat 118, and a rear wheel 120B. The pedals 112, crankset 114, and the chainring 132 may be referred to more generally as a pedal assembly.

The cycle 100 also includes several components related to providing electric propulsion in combination with manual pedal-driven power from the user. Specifically, the cycle 100 includes a transmission 104 that connects to an electric motor 106, a chainring 132 of the crankset 114, and to a rear wheel 120B (e.g., via a rear sprocket 130). Generally, this allows the electric motor 106 and crankset 114 to power the rear wheel 120B either separately or in combination.

Figure 3:
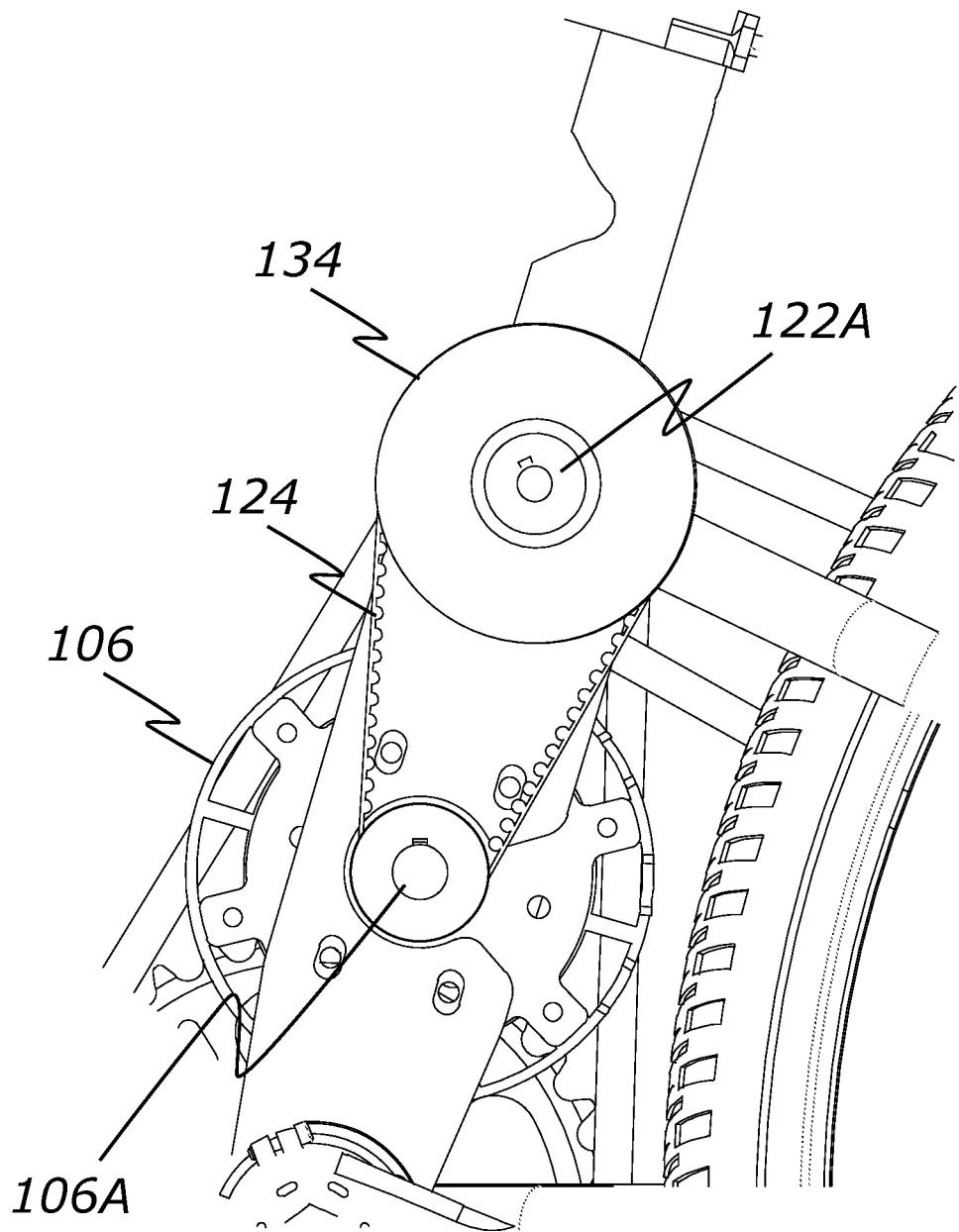
FIG. 3 illustrates an enlarged view of the cycle of FIG. 1.
Figure 4:
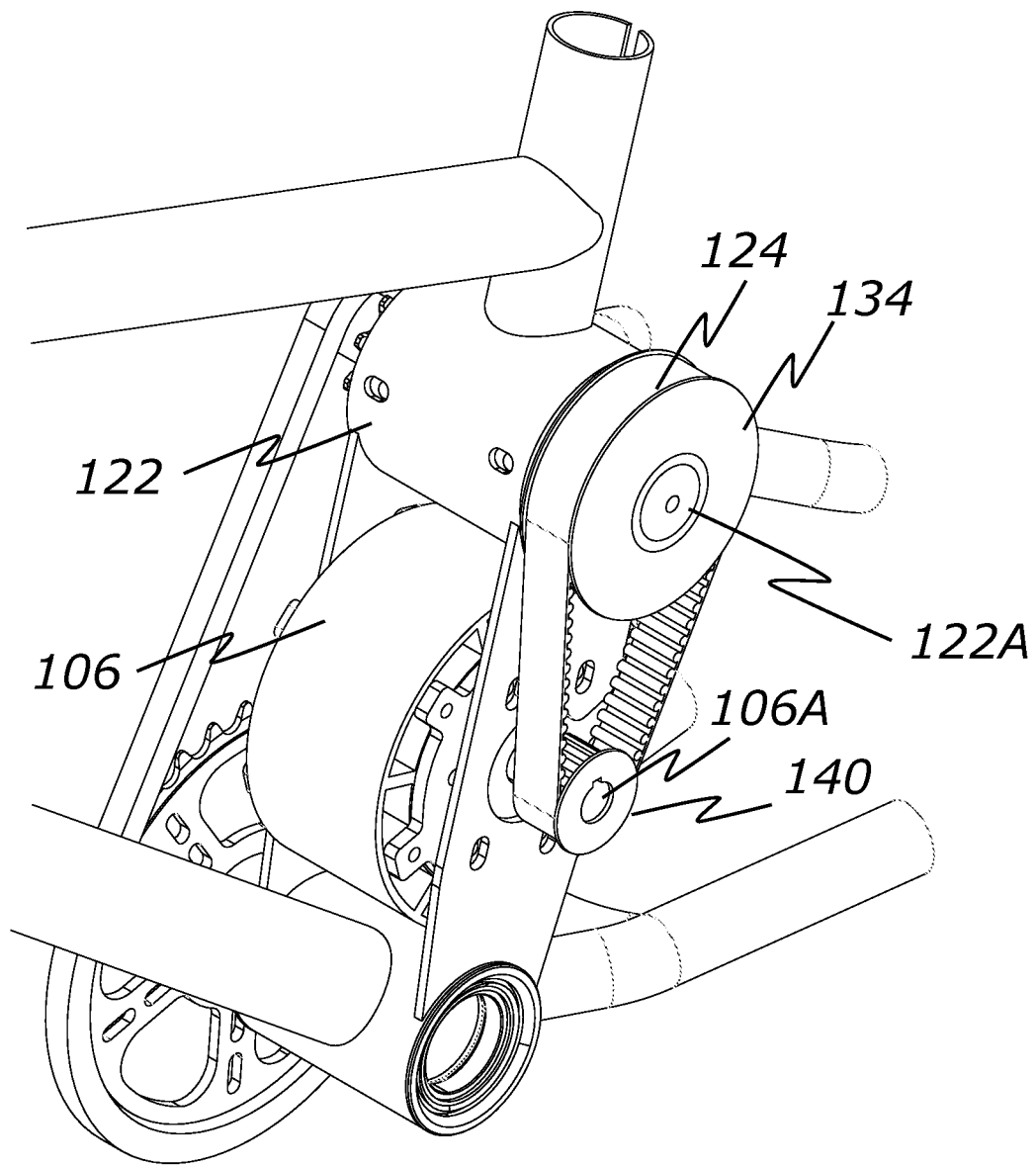
FIG. 4 illustrates a perspective view of the area of FIG. 3.

FIGS. 3 and 4 illustrate a magnified views of one side of the cycle 100 showing the connection of the electric motor 106 to the transmission 104. The electric motor 106 may be mounted within or against a motor mounting location on the body frame 102. In the present example, this location is positioned beneath the seat tube connected to the seat 118 and above the mounting location of the crankset 114. While the motor 106 may be mounted in a variety of different positions and orientations, in the present example the motor is mounted such that its output shaft 106A is generally perpendicular relative to a normal upright position of the cycle 100 and extends from a first side of the cycle 100 which is also sometimes referred to as a reduction side of the cycle 100 (e.g., a left side relative to a user riding the cycle 100).

A variety of different types of motors 106 can be used, for example the specific embodiment depicted in FIGS. 1-10 can accommodate any inrunner or outrunner motor between 60 mm and 110 mm in diameter and less than 60 mm in length. However, these physical constraints may easily be exceeded with a different embodiment of the invention having a larger or different mounting area for the motor 106. Given that use-cases vary drastically, bicycle components can handle a great deal of weight and torque, and bicycle-mountable batteries of various voltages are available to power just about any motor, the practical range on the size and power of usable motors in an embodiment is quite wide. An embodiment may use a motor weighing only a few pounds and offering no more than 150 watts, or accommodate a motor weighing upwards or 20 pounds and running at over 10,000 watts. Similarly, since the reduction ratio of an embodiment can be easily altered, and a variety of battery voltages can be employed, the range of Kv and Kt values of usable motors is also quite wide; for example, an embodiment may use motors with a Kv of up to 250, and a Kt as low as 20 mNm/A, as well as motors with a Kv as low as 10 and a Kt of 1500 mNm/A.

It may be desirable to include a gearbox 122 (also shown in FIG. 10) as part of the transmission 104. The gearbox 122 may be connected to the electric motor 106 and may adjust the gear ratio that ultimately reaches the rear wheel 120B. Hence, a user may replace the gear box 122 with others that have a different gear ratio, depending on preference. However, depending on the motor 106, a gearbox 122 may not be necessary. Alternately, the gearbox 122 may be replaced by a shaft (e.g., a jackshaft) or similar simplified connection.

In one example, the gearbox 122 is a PLS-60 single-stage planetary gearbox with a ratio of 5:1. In another example, the gearbox is a spur style gearbox. In another example, the gearbox is a harmonic style gearbox. In another example, the gearbox 122 may have a gear ratio of up to 20:1. Depending on the speed and power of the motor, the embodiment may not need a gearbox at all, and instead may utilize a jackshaft.

The gearbox 122 may be mounted within or against a gearbox mounting location on the body frame 102, which may be adjacent to the motor 106. In the present embodiment, the gearbox 122 is mounted above the motor 106 and the beneath the seat tube, however, other locations are also possible. The gearbox 122 may include a gearbox input shaft 122A that is generally horizontal relative to a normal upright position of the cycle 100 and extends from a first side of the cycle 100 (e.g., a left side relative to a user riding the cycle 100).

As seen best in FIGS. 3 and 4, the output shaft 106A of the motor 106 can be coupled with a gearbox pulley 134 connected to the gearbox input shaft 122A. In the present embodiment, a toothed belt loop 124 (also referred to as a linkage loop) is connected to both components, but a chain or similar component may also be used.

Figure 5:
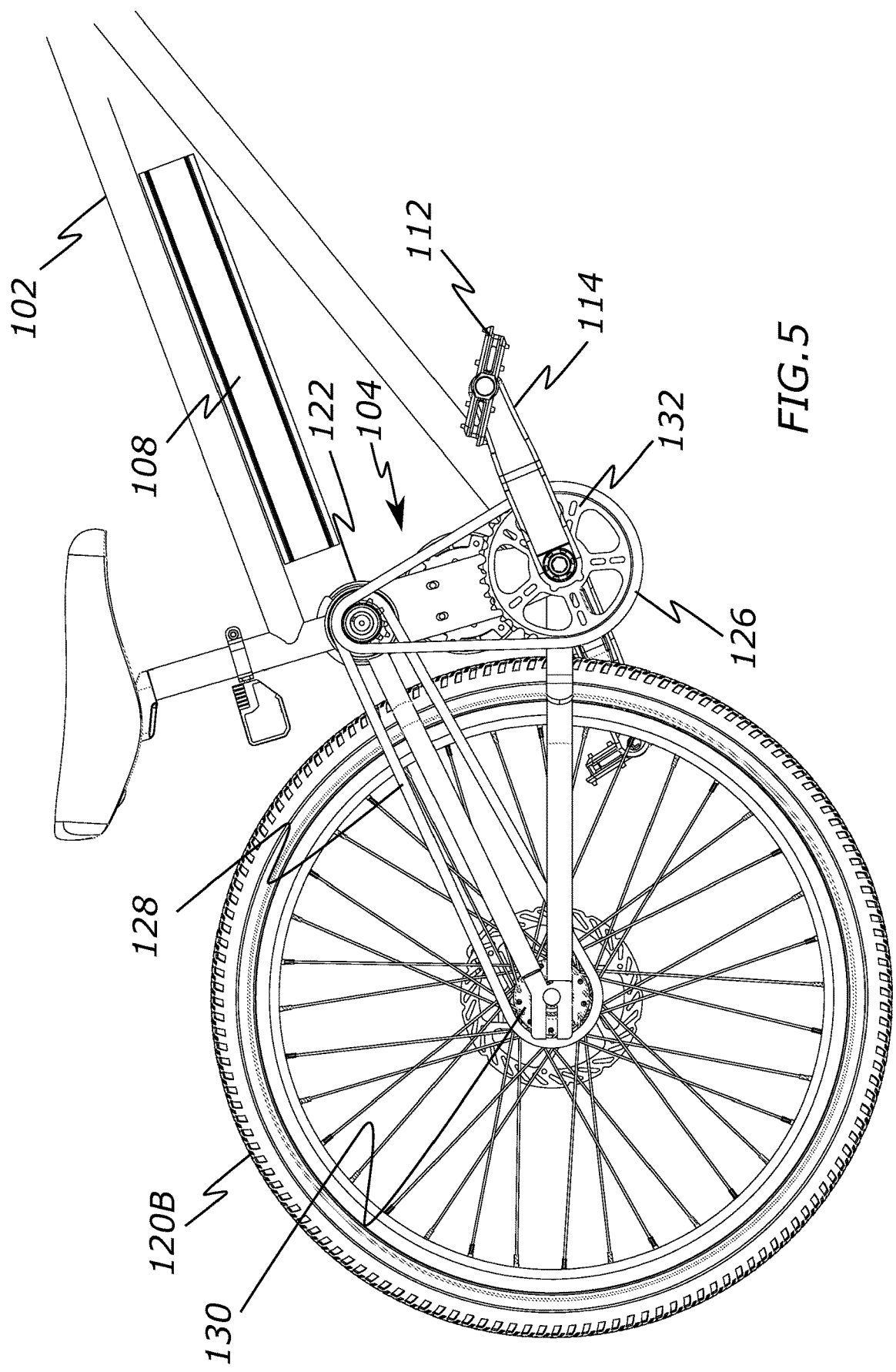
FIG. 5 illustrates a partial view of the cycle of FIG. 1.
Figure 6:
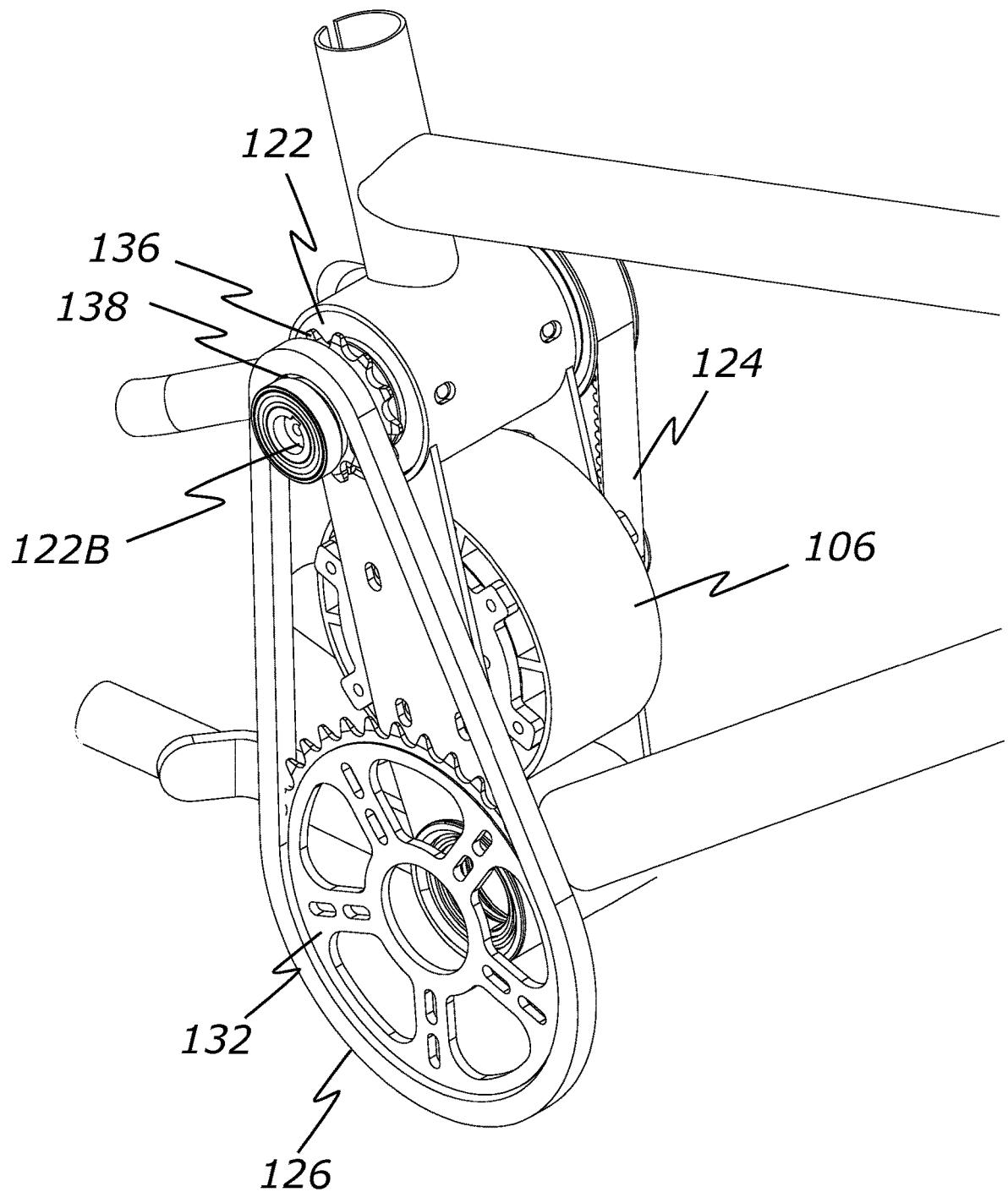
FIG. 6 illustrates an enlarged view of the cycle of FIG. 1.
Figure 7:
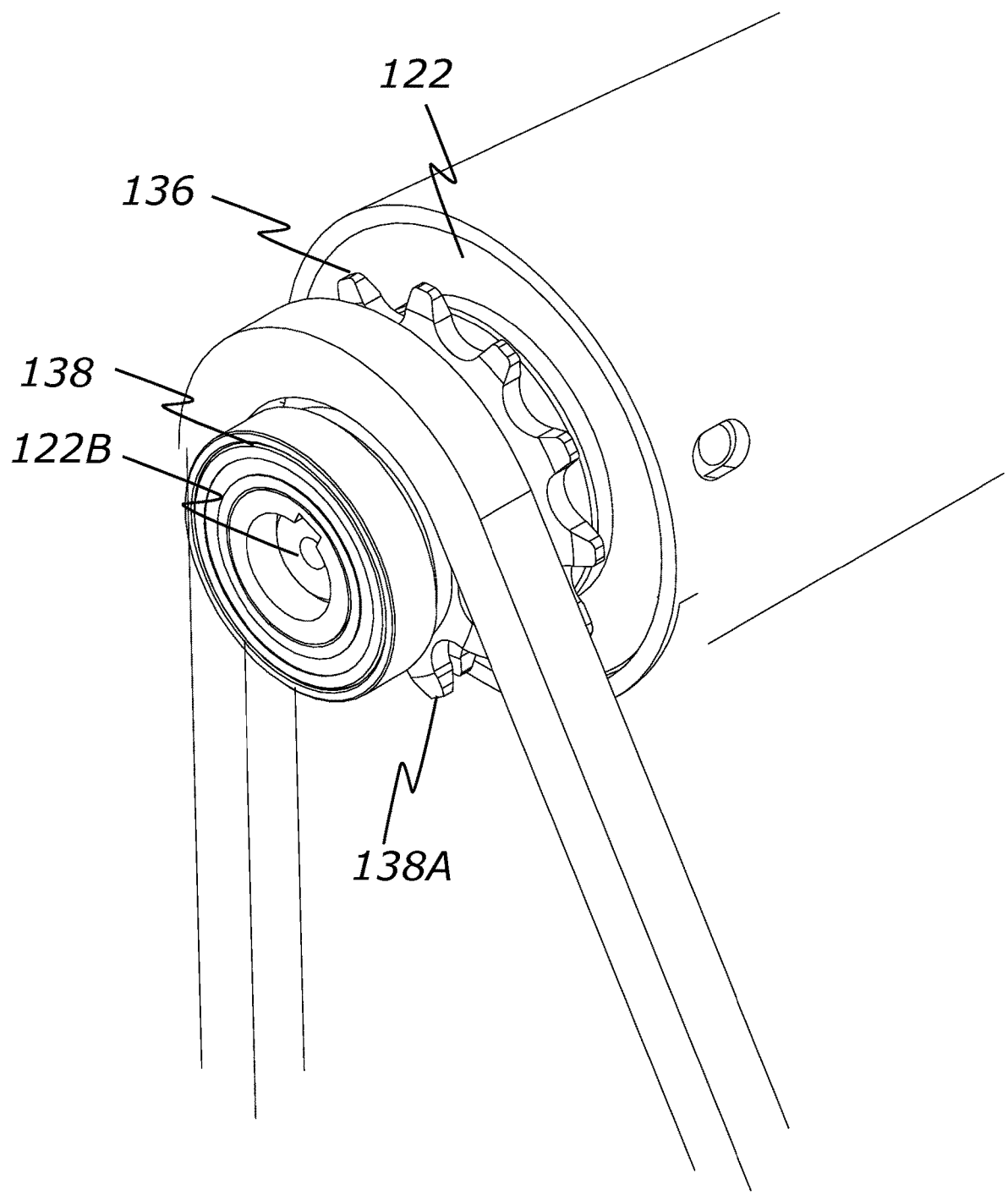
FIG. 7 illustrates a further enlarged view of FIG. 6.

As best seen in FIGS. 5-7, the gearbox 122 also includes a gearbox output shaft 122B that rotates at a different speed/ratio relative to the input shaft 122A and extends in a generally horizontal orientation from a second side of the cycle 100 (e.g., a right side relative to a user riding the cycle 100). Again, in an alternate embodiment, the gearbox 122 may not be necessary and therefore a jackshaft may be used or the output shaft 106A of the electric motor 106 may instead face outward from the second side of the cycle 100.

The gearbox output shaft 122B may be connected to two chains. The first is drive chain 128 (also referred to as a first linkage loop), seen best in FIG. 5, which forms a loop around a sprocket 130 connected to the rear wheel 120B, as well as an output sprocket 136 of the output shaft 122B. Hence, when the output shaft 122B rotates, the drive chain 128 moves, causing the sprocket 130 and thereby the rear wheel 120B to rotate. In some embodiments, the rear wheel 120B may include only a single sprocket 130 (e.g., a single non-shifting cycle such as a BMX bike). In other embodiments, multiple sprockets 130 of different sizes may be included, along with a derailer mechanism for switching between these sprockets 130.

As best seen in FIGS. 5-7, a second chain 126 (also referred to as a second linkage loop) is looped around the output shaft 122B and the chainring 132 connected to the crankset 114. However, the second chain 126 is disposed around a one-way clutch mechanism 138, which may also include a sprocket 138 fixed around its outer diameter. The one-way clutch mechanism 138 may be configured such that when the pedals 112 are pedaled backwards the clutch mechanism 138 is disengaged with the output shaft 122B and when the pedals 112 are stationary and the output shaft 122B is rotating in a direction to drive the rear wheel 120B, the clutch mechanism 138 is also disengaged. However, if the user is pedaling in a forward direction, the clutch mechanism 138 engages the output shaft 122B and transfers rotational force to the output shaft 122B and ultimately to the rear wheel 120B. Hence, the user may provide motive force to the back wheel 122B and the electric motor 106 may also provide motive force.

In one example, the one-way clutch mechanism 138 may be a sprag with supporting bearing on either side. In another example, the one-way clutch mechanism 138 is a pawl freewheel. In another example, the one-way clutch mechanism 138 is a star-ratchet style freewheel.

Alternately, the clutch mechanism 138 may be located in another location, such as between the chainring 132 and the crankset 114, or even integrated into the gearbox 122 (e.g., with inner and outer output shafts).

The electric motor 106 must be controlled and supplied with power in order to function. In the example cycle 100 of the figures, a battery housing 108 has an elongated shape and is mounted to the body frame 102, such as the underside of the crossbar. However, other locations on the cycle 100, in the cycle 100 (e.g., in the body frame 102), or in an add-on storage fixture (e.g., saddle bags) are also possible.

The battery housing 108 (and the batteries inside it) can be connected via electrical wires (not shown) to a motor controller within controller housing 110, which is further connected to the motor 106. The motor controller may comprise a processor or microcontroller and a data storage device that are configured to execute programming to selectively power the motor 106. For example, the controller may respond to variable voltage or current from a variety of inputs in such a way as to adjust the speed or torque output of the motor. Inputs include but are not limited to a thumb or twist throttle, torque sensor, cadence sensor, speed sensor, and brake cutoff sensor. The motor controller settings may also be adjustable via a wired connection such as a computer, handlebar display, or via a wirelessly connected app.

As previously described, the cycle 100 including the transmission 104 may connect or couple the electric motor 106 and the gearbox 122 to the transmission 104 between the crankset 114 and the rear wheel 120B. In that respect, the body frame 102 of the cycle 100 may also be structured to accommodate such a design of the transmission 104, including mounting locations for the electric motor 106 and gearbox 122 (or alternately jackshaft). Hence, the present invention also includes a body frame 102 with mounting locations at approximately a middle of the body frame 102 (e.g., beneath the seat 118) for at least an electrical motor 106 and optionally a gearbox 122.

Figure 8:
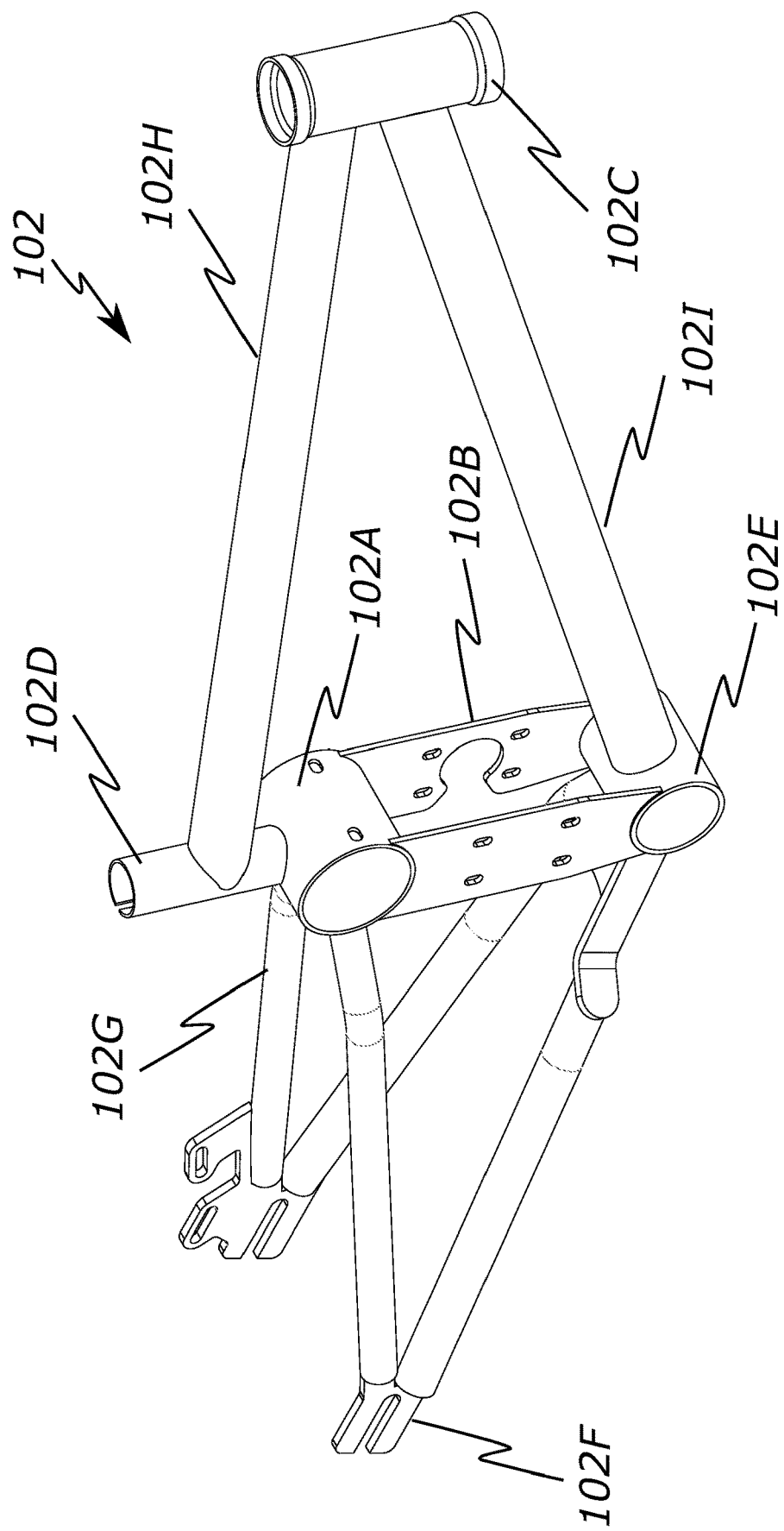
FIG. 8 illustrates a cycle body frame of the cycle of FIG. 1.
Figure 10:
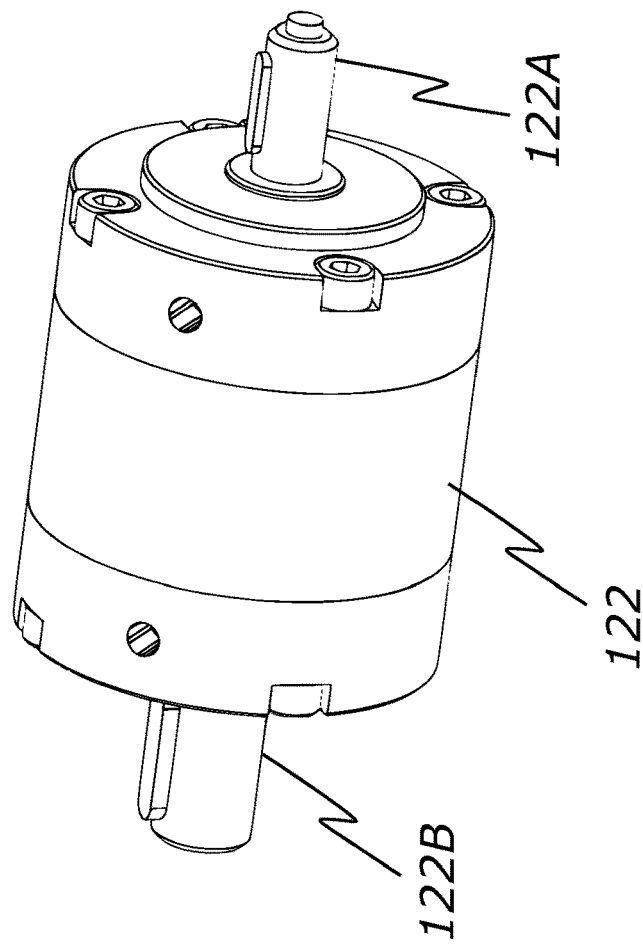
FIG. 10 illustrates a reduction gearbox of the cycle of FIG. 3.
Figure 9:
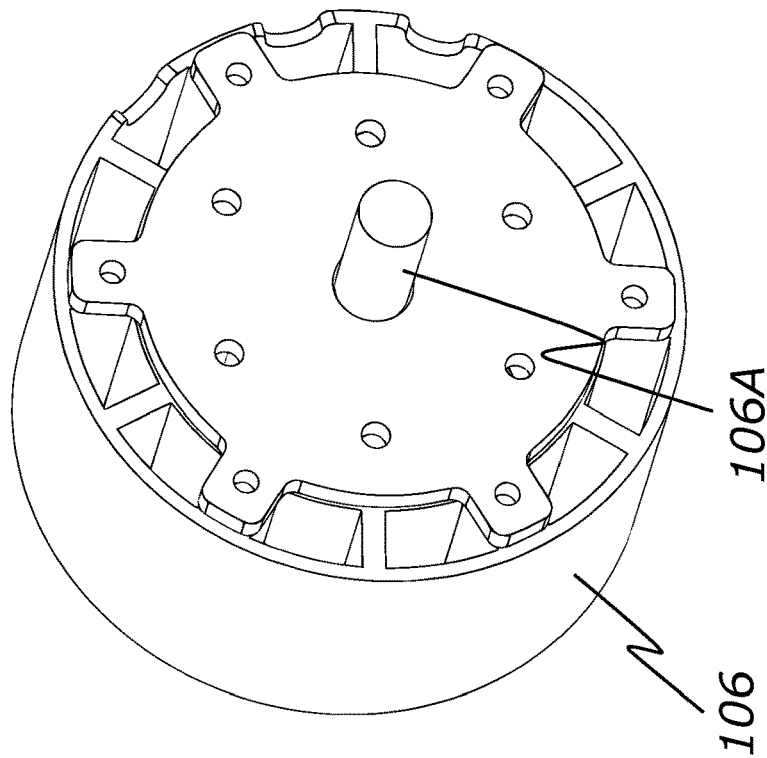
FIG. 9 illustrates an electric motor of the cycle of FIG. 1.

As seen in FIG. 8 illustrating only the body frame 102, a gearbox mounting location 102A may be located in the mid area of the body frame 102 and may include mounting features (e.g., bolt/screw apertures) to mount the gearbox 122 to the mounting area 102A. While several different locations for the mounting area 102A are possible (e.g., forward locations or rearward locations), the mounting area 102A is located, in the present example, beneath the seat tube 102D, and is directly connected to both the seat tube 102D and the seatstay 102G (rear cross tubes). The mounting area 102A preferably includes open areas on either side, allowing the input shaft 122A and output shaft 122B to be exposed, but may otherwise be covered or exposed in various amounts. In the present example, the mounting area 102A has a circular tubular shape that is open on each side of the cycle 100 but may also have other shapes (square or rectangular tubular shape), depending on the shape of the gearbox 122. Alternately, the mounting area 102A may be attached to or otherwise positioned between the top tube 102H and the bottom tube 102I.

As also seen in FIG. 8, an electrical motor mounting area 102B may also be located at the mid area of the body frame 102, though different locations are also possible (e.g., forward locations or rearward locations). In the present example, the motor mounting area 102B comprises at least two plates that are connected to the gearbox mounting areas 102A at the top and to the crankset mounting location 102E at the bottom. The plates may include mounting features (e.g., bolt/screw apertures) and at least one opening on through which the output shaft 106A may pass through. Optionally, additional housing components may be included to conceal the motor 106. Alternately, the mounting area 102B may be attached to or otherwise positioned between the top tube 102H and the bottom tube 102I.

Note, the mounting areas 102A and 102B may also be referred to as brackets or similar mounting fixtures. Additionally, a variety of different mounting mechanisms may be used for their respective components, such as bolts, screws, latches, or similar mechanism. Additionally, these mounting areas 102A and 102B may be broadly considered to be between the seat tube 102D and the crankset mounting location 102E, which should be considered a mid-region of the body frame 102. However, other locations are also considered within a mid-region and can be used for mounting locations, such as between the top tube 102H and the down tube 102I of the frame 102. The mounting areas 102A and 122B may also be considered adjacent to each other, though non-adjacent positions are also possible.

The body frame 102 may also include other features common to known bike frames, such as a mounting tube 102C for connecting the front wheel fork and handle assembly 116, and rear wheel connection areas 102F to connect the rear wheel 120B The present invention may also include a kit of parts that allows either a normal, known cycle body frame to be adapted with the previously discussed motor and transmission system, or a variation of the body frame 102 previously discussed. On traditional bicycle frames, a self-contained version of the system could be fashioned so as to mount between the bottom bracket and juncture of the top-tube and seat-tube, with the most likely mounting points being the top-tube and seat-tube. Hence, such a kit may include mounting brackets for one or more of the electric motor 106, battery 108, controller 110, and other components of the transmission assembly 104.

Several advantages of the previously described cycle 100 and transmission 104 will now be described.

The aforementioned design of the body frame 102 places the electric motor 106 in the area of the cycle 100 traditionally reserved for only the bottom portion of the seat-tube 102D. This area of the frame 102 allows the motor 106 to be removed, installed, or repaired independently of interfering with any component that would hamper the full functionality of the cycle 100. In some embodiments, one could even remove the electric motor 106 while simultaneously pedaling the cycle 100 throughout the process. In this respect the motor 106 may not necessarily be required to be present/connected to the cycle 100 for the cycle 100 to operate via the pedals 112.

By contrast, the two most prominent electric bicycle designs—hub-drive electric bicycles and mid-drive electric bicycles—do not allow for the aforementioned functionality. By necessity of design, a hub-drive motor is encased inside one of the hubs of the wheels of the bicycle. Therefore, in order to install, remove, or repair the motor of a hub-drive system, one must remove a wheel of the bicycle, preventing it from being used for its intended motive functionality.

In a mid-drive bicycle motorization system, the electric motor is mounted inside or attached onto the bottom bracket of the bicycle. In order to install, remove, or repair the motor of a mid-drive system, one must typically remove some part attached to the bottom bracket, for example the cranks of the bicycle, if not the entire bottom bracket altogether. Since such components of the bicycle are essential to its intended motive functionality, installing, repairing, or removing the motor of mid-drive bicycle renders it inoperable.

The ability to install, remove, or repair the motor 106 of the invention without thereby interfering with the functionality of it as a non-motorized bicycle is an advantage to users, particularly those commuters who, in response to a motor malfunction, would need or prefer to use the invention as a traditional non-motorized bicycle while waiting for the motor to be repaired. The ability to utilize the invention without the motor will also be advantageous to those who sometimes wish to remove the motor in order to use the bicycle as a traditional bicycle without the additional weight of the motor.

The frame design of the invention also allows the motor 106, reduction gearbox 122, and controller to be installed or removed separately from one another and with minimal mounting hardware necessary for secure attachment. This contrasts with other electric bicycle designs. For example, in a mid-drive bicycle motorization system, the electric motor, reduction gearset, clutch, and often the motor controller are all mounted inside a single enclosure that either replaces or is attached to the bottom bracket of the bicycle. In hub-drive systems that require reduction gears, the motor and reduction gearset are enclosed inside the hub of the bicycle.

Because the components of mid-drive and hub-drive motorization systems are all housed in a single enclosure, implementations of the design must squeeze components into a rather tight space, and as a result it is typically the case that no one component can be removed in isolation to any of the others. For example, in a mid-drive system, one typically must remove an enclosure, the mounting hardware on a reduction gearbox, and the reduction gearbox itself, in order to remove the motor, and vice-versa. In a hub-drive system, one must remove the outer enclosure and any existing reduction gears in order to access the motor. Often, other components such as the motor controller must be removed as well.

In contrast, the motor 106, most of the reduction system (e.g., reduction gearbox 122), and the motor controller are each housed separately from one another at their respective areas on the frame of the cycle 100. This allows for ease of installation or removal of each component. In one example embodiment, the motor 106 can be attached securely with just a few bolts or screws. The reduction gearbox 122 can be secured in the upper bracket or mounting area 102A by as few as just two bolts for example. The clutch 138 may be held securely on the shaft 122B with just one bolt. Each of these bolts may be of the same size, and removable using the same wrench. Theoretically, some of these components could be instead secured with quick release mechanisms or slip-fit tolerances, thereby increasing ease of detachment.

In addition, the motor 106 of the embodiment shown in the figures can be removed after only detaching the minimal mounting hardware and wiring harness without removing most of the reduction gearbox 122, clutch 138, motor controller (i.e., motor controller housing 110), or any of their associated mounting hardware. The reduction gear box 122 can be removed without removing the motor 106, motor controller, or any of their associated hardware, and the clutch 138 can be removed without removing the motor 106, reduction gearbox 122, motor controller, or any of their associated hardware.

The modularity and minimization of the mounting hardware necessary for secure attachment of motorization components helps maximize ease of service and user-serviceability of the invention in comparison to the aforementioned electric bicycle designs. Indeed, one complaint often found from both consumers and servicers of the aforementioned electric bicycle designs is the difficulty of repair resulting from relatively intricate assembly schemes of the motorization components.

Generally, many electric motors commonly available for purchase today are typically used for other non-bicycle purposes, such as for remote controlled airplanes, drones, industrial equipment, and so on. Electric bicycle designs such as mid-drives and hub-drives do not facilitate the use of these alternative motors without also requiring substantial and difficult alteration to other motorization components as well, particularly the housing and reduction gears. Such alterations require highly specialized tools and expertise that the vast majority of consumers lack. In practice, consumers cannot utilize most motors on the market and can instead change the motor on their electric bicycle only by purchasing an entire motorization system that is often proprietary to the frame of their electric bicycle; e.g. a particular hub-drive or mid-drive kit. This severely limits the options for consumers.

It is an advantage of the present invention that it facilitates the use of a variety of types of the aforementioned electric motors 106 without requiring major alteration to any other motorization component. For example, the motor mounting area 102B of the body frame 102 may offer mounting points consistent with several motors within a reasonable size range, for example sized 60 mm long or less and 110 mm in diameter or less. The reduction gearbox 122, motor controller, and battery power of one embodiment may be consistent with any motor within a wide power and speed range, for example up to 5000 watts between 100kv and 170kv. Hence, no physical alteration to the motor mount, reduction system, or motor controller would be required. Instead, a user would only need to attach the proper wiring harness and alter the settings on the motor controller to match the motor. These steps require only a hobbyist level of expertise and are easy enough for most consumers to master.

A cyclist of an electric bicycle may want to change the overall reduction ratio of their electric motorization system without changing the gear ratio of their bicycle. For example, a rider may not want to use their electric motor to provide much, if any, additional power once they are pedaling at their desired speed, but instead want their motor to provide almost all the torque they need for takeoff by way of a relatively high motor reduction ratio. Conversely, a rider may want their motor to help boost their top speed with a relatively low motor reduction ratio, while they exert the most effort during moments of acceleration, such as starting from a dead stop.

Changing the motor reduction ratio of electric bicycles, particularly hub-drive and mid-drive electric bicycles, requires at the very least the dismantling of the entire system. Typically, a user can change the motor reduction ratio of their electric bicycle only by changing out the internal reduction gears. In practice, this alteration is not possible for most users.

In contrast, the present invention, in some embodiments, may include a primary reduction system, for example a chain or belt system (e.g., belt 124), that is housed on the exterior of the reduction side of the cycle 100. Such a system can be altered relatively easily without interfering with other motorization components. For example, changing the reduction ratio requires only swapping out a single pulley or sprocket 134 available on the reduction side of the cycle 100. These steps require only a hobbyist level of expertise and are easy enough for most consumers to master. The advantage to the user is that they can easily, and probably fairly quickly, alter their overall motor reduction ratio of their electric cycle 100 for greater torque or a higher top speed according to their needs.

For many users, a major advantage of bicycle ownership is the customizability and compatibility with readily available bicycle parts that have been on the market for years, as well as new parts being refined and manufactured consistent with existing standards. The two most prominent electric bicycle motorization systems limit the backwards compatibility and range of options for certain components since they require replacing or altering at least one essential feature of the bicycle. Mid-drive motorization systems either replace the bottom bracket with a motor or attach a motor onto the bottom bracket and crank spindle of the bicycle. This in turn requires system-specific bottom bracket components. In particular, the chainwheel of a mid-drive motorization system must also function as a freewheel so that the chainwheel can spin independently of the rider's cadence. This in turn requires a system-specific crank spindle, and typically requires system-specific chainwheels and cranks. Many of the bicycle parts a consumer can use on their mid-drive electric bicycle are, then, tightly constrained and typically proprietary. A rider of a mid-drive electric bicycle cannot, for example, benefit from utilizing many widely available bicycle cranksets and chainwheels.

Hub drives do not fare much better in this regard. By necessity, at least one hub of a hub-drive bicycle must consist of a hub drive motor. This constraint is all by itself suboptimal for riders, as bicycle hubs are one of the bicycle components that receive constant design innovations. Users of hub-drive electric bicycles cannot fully benefit from these innovations since they can only replace or modify at most one of their two hubs. Also, the spokes and rim that can be used with a hub-drive system will be constrained by the additional weight of the hub drive, which is often substantial.

By contrast, at least some embodiments of the invention do not require system-specificity of any of the aforementioned bicycle components, or indeed a sort of system-specificity that substantially narrows the range of essential bicycle components that a consumer may seek to use. This may allow any one of a number of existing hub, sprocket, freewheel, chainwheel, crank spindle or crank standards. The cycle 100 embodiments therefore offer as much customizability and backwards compatibility of bicycle components as any non-motorized bicycle, an aspect that is sure to offer consumers a better range of options and prices.

It is also notable that at least one embodiment of the present invention may include a seat post of a length that is shorter than most available on the market. However, nearly any seat post can be, and often is, manually shortened by a consumer or bicycle shop to suit the needs of the rider. Indeed, many seat posts are made longer than necessary so that the consumer may cut them to the length they desire.

Consequently, such an embodiment does not necessarily limit the kinds of seat posts that can be used, only their length.

Ideally, a motorization system will not limit the typical advantages of a bicycle, most notably the ability to utilize a gear and derailer system or equivalent, pedal the bicycle freely, use the bike in wet weather conditions, and maneuver the bicycle without needing to compensate for a substantial amount of weight disequilibrium. A brief comparison of three motorization systems will clarify why the present invention excels at this functionality over prior electric bicycle designs.

A friction-drive motorization system places the spinning output shaft or shell of an electric motor directly against a wheel of the bicycle, thereby accomplishing the necessary speed reduction without the use of any gears, chain, or other drivetrain. Unfortunately, the flexibility of bicycle tires introduces a high degree of variation in friction between the spinning motor and the wheel, thereby introducing inefficiencies in the system. Moreover, the necessary friction for motorization is often lost in wet weather conditions. These disadvantages, as well as a further disadvantage cited below, are the primary reasons why this motorization system is not prominent.

Some electric bicycle designs transfer the power of the rider's cadence to the rear wheel of the bicycle by way of a traditional bicycle drivetrain and transfer the power of the electric motorization system to the rear wheel of the bicycle by way of a second and independent drivetrain on the side of the bicycle opposite the side of the chainwheel. Such a system is mechanically efficient. However, it has the disadvantage of requiring highly specialized rear hubs and sprockets.

Hub-drive motorization systems are the most common motorization systems on the market. However, the reasons for this are primarily financial. Cost advantages aside, these systems introduce major disadvantages to riders. First, the additional weight of a hub-drive system is placed at one end of the bicycle. This creates additional rotating weight and weight disequilibrium for the rider, which in turn hampers their maneuverability and control of the bicycle. Second, the wheels of the bicycle absorb the most shock. This shock transfers to the hub motor and can cause damage to it and its internal gears.

Finally, because each of the three systems cited is configured to spin a wheel of the bicycle directly, the rider cannot utilize the bicycle's gearset or derailer system to instantaneously change the speed or torque of their motorization system. This is especially disadvantageous when encountering terrain or inclines that the electric motorization system is not internally geared to handle. For example, a cyclist would typically use their derailer and gearset to change to a lower gear ratio in order to climb a hill more easily. Any electric bicycle motorization system that spins the wheel independently of the bicycle's gears can't apply this advantage to their electric motorization system. Such systems may give the appropriate amount of torque for flat roads but not enough torque for hills. Likewise, they may give the appropriate amount of torque to handle hills but not enough top speed to be practical on flat roads. These systems cannot, then, benefit riders roughly equally in all cycling circumstances.

The aforementioned disadvantages of hub-drives and other such systems are among the reasons that the more expensive mid-drive systems are increasing in prominence. A mid-drive motor either replaces or attaches to the bottom bracket of the bicycle and drives the chainwheel of the bicycle in order to spin its rear wheel at the desired speeds by way of a chain or belt. Because the weight of the mid-drive is placed more centrally, it does not create as much weight disequilibrium as hub drive systems, and does not absorb nearly as much shock from impact on the wheels. Also, because mid-drive systems spin the chainwheel of the bicycle, the system is reasonably weather resistant and consistent with the use of bicycle gears. For example, when a rider shifts their rear derailer, the torque and top speed that their mid-drive can achieve changes accordingly.

Like mid-drive motorization systems, embodiments of the invention place the weight of the motor and motorization components centrally on the bicycle, and utilizes a primary drive system that is also reasonably weather resistant and compatible with the gearset and rear derailer systems featured on many traditional bicycles. Certain embodiments of the invention therefore have each of the aforementioned advantages of mid drive systems over hub drive systems.

Ideally, a motorization system utilizing a drivetrain will be as efficient and as lightweight as possible. As of this writing, electric motors that are lightweight enough to remain practical on electric bicycles spin at relatively high speed and low torque in comparison to the drive wheel of the bicycle itself. This is why electric bicycle motorization systems tend to utilize some form of speed reduction system in order to transmit the power of the motor to one of the wheels of the bicycle at the desired speed and torque without greatly increasing the weight of the bicycle.

A mid-drive motor either replaces or attaches to the bottom bracket of the bicycle and drives the chainwheel of the bicycle in order to spin its rear wheel at the desired speeds. However, mid-drive systems are beset with two sorts of mechanical inefficiencies in comparison with the invention. First, they require a higher ratio of speed reduction for the motor than the invention. Second, they typically apply a speed increase after the total speed reduction, while the invention does not. Each of these disadvantages is discussed in turn.

Aside from instances where incredibly high torque is needed, for example when climbing a steep hill, the wheel(s) of a bicycle must in the interest of practicality spin at far faster speeds than the rider's cadence. Because the mid-drive motor spins the chainwheel to propel the bicycle via the traditional bicycle drivetrain, it must reduce its overall speed to the cadence of the rider and/or chainwheel rather than the desired speed of the rear wheel. This may not be the case for certain embodiments of the invention, as it does not utilize the traditional bicycle drivetrain. Instead, the motor 106 drives the rear wheel 120B via a primary drivetrain or transmission 104 that can spin the rear wheel 120B while leaving the chainwheel 132 at rest. Consequently, it is not necessary to reduce the overall speed of the motor 106 of certain embodiments to the cadence of the chainwheel 132. Instead, it is only necessary to reduce the motor of an embodiment to a speed no slower than the desired speed of the rear wheel 120B. Hence, the invention may require much less total speed reduction of the motor 106. All else being equal, the greater the total speed reduction of a system, the greater the mechanical inefficiency of that system, and the greater the weight of the reduction system. Hence, all else being equal, the invention can utilize a reduction system that is more mechanically efficient and lighter weight than the competing mid-drive system.

In most situations, a cyclist will choose a chainwheel with larger teeth than the driven sprocket on the rear wheel of the bicycle. So, a mid-drive system typically reduces the overall speed of the motor to the cadence of the cyclist only to then have this relatively low speed sped back up by way of the drivetrain of the bicycle. This is an additional mechanical inefficiency that the present invention lacks.

For example, consider a common situation: a cyclist riding a bicycle using a chainwheel of 44 teeth, a rear cog of 16 teeth, and wheels that each total 545.1 mm in diameter (507 mm ISO with 25.4 mm tires). Suppose that a rider of this bicycle intends to move at an average speed of 15 mph. The rider would need the rear wheel to spin at 220 rpms. Accomplishing this average speed by way of cycling the vehicle would require the rider to spin the chainwheel at the comparatively lower average speed of 80 rpms. Now consider a mid-drive motor utilizing a motor spinning at 4000 rpms. Because the mid-drive motor spins the chainwheel in order to power the bicycle, it must reduce its overall speed by a ratio of 50:1 in order to achieve the rider's cadence of 80 rpms. The power transferred to the chainwheel would then be transferred to the rear wheel by way of the bicycle's drivetrain, which in turn acts as a speed increaser of 1:2.75 in order to drive the rear wheel at 220 rpms. This additional speed alteration introduces mechanical inefficiency.

Certain embodiments of the invention instead spin the rear wheel 120B by way of a primary drive system. Therefore, an embodiment utilizing the same motor 106 would only require an overall reduction of roughly 18:1 in order for the rider to achieve the same bicycle speed of 15 mph. This is a drastically lower reduction ratio, and there is no need for any further speed alterations. All else being, this a substantially more mechanically efficient and in turn lighter weight system.

The present invention may also include a method of operating the previously described embodiments. The present invention may also include a method of assembling any of the previous embodiments, including assembling an entire original cycle and upgrading an existing prior art cycle with the transmission assembly, motor, battery, and controller of the present invention, which may be optionally sold as a kit.

The term "operatively linked" is used in this specification to describe a connection between two or more components. Such a connection may be a direct connection between the two components or may be made via one or more intermediate components. Particularly with regard to transmission components, one or more gears, sprockets, chains, belts, or similar components may be part of a linkage between two components such that they operate in a specified manner and therefore may be "operatively linked."

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A cycle comprising:
   a body frame;
   at least a first wheel and a second wheel connected to the body frame;
   a pedal assembly connected to the body frame;
   an electric motor connected to the body frame; and,
   a transmission assembly comprising:
      a first linkage loop operatively linked to the second wheel; and,
      a second linkage loop operatively linked to rotate with the pedal assembly;
      wherein the first linkage loop and the second linkage loop are operatively linked to the electric motor;
   wherein the transmission assembly further comprises a one-way clutch mechanism connected between the second linkage loop and the electric motor, such that the electric motor may drive rotation of the first linkage loop while the pedal assembly is stationary; and,
   wherein the transmission assembly further comprises a gearbox having an input shaft operatively linked to the electric motor, and an output shaft operatively linked to the first linkage loop and the second linkage loop; wherein the gearbox changes a speed of rotation of the input shaft relative to the output shaft.

2. The cycle of claim 1, wherein the one-way clutch mechanism is positioned on the output shaft of the gearbox and engaged with the second linkage loop.

3. The cycle of claim 1, wherein the second linkage loop is engaged with a rear sprocket of the second wheel.

4. The cycle of claim 1, wherein the body frame includes an electric motor mounting area configured to mount the electric motor; the electric motor mounting area being located between a crankset mounting location and a seat tube configured to mount a cycle seat.

5. The cycle of claim 4, wherein the body frame further includes a gearbox mounting location located adjacent to the electric motor mounting area.

6. The cycle of claim 5, wherein the electric motor mounting location is configured to orient an output shaft of an electric motor on a first side of the cycle body frame and wherein the gearbox mounting location is configured to orient an input shaft of a gearbox on the first side of the cycle body frame; and wherein the gearbox mounting location is configured to orient an output shaft of the gearbox on a second side of the cycle body frame.

7. The cycle of claim 1, wherein the electric motor is mounted to a mid-region of the body frame.

8. The cycle of claim 1, wherein the first linkage loop and the second linkage loop are chain loops.

9. A cycle comprising:
   a body frame;
   at least a first wheel and a second wheel connected to the body frame;
   a pedal assembly connected to the body frame;
   an electric motor connected to the body frame; and,
   a transmission assembly comprising:
      a first linkage loop operatively linked to the second wheel; and,
      a second linkage loop operatively linked to rotate with the pedal assembly;
      wherein the first linkage loop and the second linkage loop are operatively linked to the electric motor;
   wherein the electric motor is connected to an input shaft of a gearbox by a third linkage loop; wherein the first linkage loop is connected to an output shaft of the gearbox and to a sprocket fixed to the second wheel; and wherein the second linkage loop is connected to the output shaft of the gearbox via a one-way clutch mechanism and is connected to a chainring of the pedal assembly.

10. The cycle of claim 9, wherein the body frame includes an electric motor mounting area configured to mount an electric motor; the electric motor mounting area being located between a crankset mounting location and a seat tube configured to mount a cycle seat.

11. The cycle of claim 10, wherein the body frame further includes a gearbox mounting location located adjacent to the electric motor mounting area.

12. The cycle of claim 11, wherein the electric motor mounting location is configured to orient an output shaft of an electric motor on a first side of the cycle body frame and wherein the gearbox mounting location is configured to orient an input shaft of a gearbox on the first side of the cycle body frame; and wherein the gearbox mounting location is configured to orient an output shaft of the gearbox on a second side of the cycle body frame.

13. The cycle of claim 9, wherein the electric motor is mounted to a mid-region of the body frame.

14. The cycle of claim 9, wherein the first linkage loop and the second linkage loop are chain loops.

15. A kit for upgrading a cycle comprising:
   a motor mounting bracket configured to mount an electric motor;
   a gearbox mounting bracket configured to mount a gearbox;
   a transmission assembly comprising:
      a first linkage loop sized to operatively link to a rear wheel of the cycle and to a gearbox mounted in the gearbox mounting bracket; and,
      a second linkage loop sized to operatively link to a pedal assembly of the cycle and to a gearbox mounted in the gearbox mounting bracket; and,
      a third linkage loop sized to operatively link to the gearbox mounting in the gearbox mounting bracket and to the motor mounting bracket.

16. The kit of claim 15, wherein the kit further includes the electric motor and the gearbox.

17. The kit of claim 16, further comprising a one-way clutch mechanism configured to attach to an output shaft of the gearbox.

\* \* \* \* \*